US008109310B2

(12) United States Patent
Višt

(10) Patent No.: US 8,109,310 B2

(45) Date of Patent: Feb. 7, 2012

(54) ROTATIONAL VACUUM PRESS WITH A MEMBRANE

(76) Inventor: Zvjezdan Višt, Doboj (BA)

( * ) Notice: Subject to any disclaimer, the term of this patent is extended or adjusted under 35 U.S.C. 154(b) by 11 days.

(21) Appl. No.: 12/680,887

(22) PCT Filed: Oct. 24, 2007

(86) PCT No.: PCT/BA2007/000009

§ 371 (c)(1), (2), (4) Date: Mar. 30, 2010

(87) PCT Pub. No.: WO2009/043120

PCT Pub. Date: Apr. 9, 2009

(65) Prior Publication Data

US 2010/0206489 A1 Aug. 19, 2010

(30) Foreign Application Priority Data

Oct. 3, 2007 (BA) .............................. BAP072594A

(51) Int. Cl.
*B32B 37/00* (2006.01)

(52) U.S. Cl. ........ 156/358; 156/359; 156/381; 156/499; 156/579

(58) Field of Classification Search .................. 156/285, 156/286, 382, 499, 580, 581, 583.1, 583.3, 156/350, 358, 359, 381, 579

See application file for complete search history.

(56) References Cited

U.S. PATENT DOCUMENTS 2,661,789 A 12/1953 Keller
4,078,962 A * 3/1978 Krueger ........................ 156/497
4,188,254 A * 2/1980 Hemperly, Jr. ................ 156/382
4,447,282 A * 5/1984 Valerio et al. ................ 156/285
5,225,027 A * 7/1993 Diekwisch .................... 156/382

(Continued)

FOREIGN PATENT DOCUMENTS

CH 192 193 A 7/1937

OTHER PUBLICATIONS

International Search Report, Jun. 3, 2008, from International Phase of the instant application.

(Continued)

*Primary Examiner* — James Sells

(74) *Attorney, Agent, or Firm* — Jackson Patent Law Office

(57) ABSTRACT

The rotational vacuum press with a membrane; according to the invention, is aimed at veneering of profiled surfaces and laminating of wooden elements and other materials according to a modem facilitated with pressure generated by vacuum and applied on the surface through the membrane. It is consisted of the main construction (21) on which central axis (16) is placed on which at least four turning working tables are placed (12) with moveable frame (14) which has an elastic rubber membrane fixed on (13) under which, on the working table (12), a working piece (15) is placed preheated in the heating chamber (31) with heaters (36), which is placed on rails in the low down part of the construction (21). On the surface of the table (12) there are canals (11) for vacuum, connector (18) and the vacuum conduit (17) linked by the vacuum conduit (10) through the irreversible valve (4) and entry filter (2); with vacuum pump (1) which has an outlet filter on (3) and is fixed on the carrier (27): Locking of the working table (12) is achieved by the mechanism (22) with lever (23) and handle (24). The press and heating chamber (31) are linked with the control cabinet (26).

2 Claims, 4 Drawing Sheets

U.S. PATENT DOCUMENTS 5,522,478 A * 6/1996 Diekwisch .................... 187/273
5,529,658 A * 6/1996 Diekwisch .................... 156/475
5,580,415 A * 12/1996 Diekwisch .................... 156/382
5,820,724 A * 10/1998 Diekwisch .................... 156/382

OTHER PUBLICATIONS

Claims, May 9, 2011, from European Patent Register of the instant application.

Letter accompanying subsequently filed items, May 9, 2011, from European Patent Register of the instant application.

Reply to communication from the Examining Division, May 9, 2011, from European Patent Register of the instant application.

Communication about intention to grant a European patent, Jun. 14, 2011, from European Patent Register of the instant application.

* cited by examiner

ROTATIONAL VACUUM PRESS WITH A MEMBRANE

THE TECHNICAL FIELD

The invention, looked at in a broader sense, is pertaining to the area of timber industry specifically to the press with pressing elements that are set in a form of an elastic element started under the pressure of a fluid, created for the purpose of veneering of profiled surfaces and laminating of lumber elements according to a model therein facilitated with the vacuum formed pressure applied on the surface by the membrane.

According to the International Patent Classification, the inventory subject is classified and marked with classifying symbols (7) B30B 5/02, B29C 51/28 and B29C 51/16.

TECHNICAL PROBLEM

Technical problem resolved by this invention is consisted of the following: how to constructionally resolve the vacuum press with a membrane for veneering of profiled surfaces and laminating of elements according to a model for achieving a greater capacity, a very small spending of energy and reduction of maintenance cost, and the aforementioned has been attained by the proposed construction with four or several working tables with membrane that rotate around the central axis.

BACKGROUND ART

Presently it is known that the vacuum technology is applied in the way that the pressure created by vacuum is passed on from the membrane onto the working piece, and heating of the material i.e. thermal part of the procedure is done by the membrane from above downwards. This technique requires multiple energy to make the heat go into the adhesive layer through the membrane and veneer thus shortening the effective living time of the membrane which needed to be a silicone one in that case. It is also known that the currently applied presses for this purpose have only operated in one drive i.e. with one working table.

In patent and non-patent literature there are many solutions that resolve this problem and only some of the constructions from significant producers will be mentioned in the further text like: companies COLUMBUS, DE; ELKOM, DE specialized for sanitary devices and kitchen accessories; NABUURS, ES who has registered the patent No. W0 02/094546: WEMNOENER HEINRICH GMBH; DE who registered the patent No. DE 102004033540 for door coating and three-dimensional contours; ORMAMACCHINE SPA, IT who registered the patent No. EP 1790464 with a press for door coating and window coating and PROGETTO ABITARE, IT with a press for veneering who registered the patent No. EP 1437204. All the aforementioned solutions are with one drive i.e. one working table and are characterized with a larger energy spending, smaller capacity and longer operating time per a production unit. This invention applies the method which is to preheat the material that is to be veneered or laminated on 65° C. in the chamber which quickens the adhesive processes and brings it to the same time like already known presses operate with and which presses for their methods need to use temperature of 120° C. because they heat up through the 3 mm thick membrane including the material it is coated with. Also this invention applies several working tables that rotate around the central axis thus increasing the capacity of work proportionally.

Searching for the patent documentation and going through the relevant literature from this area, no similar resolution of the technical problem has been come across.

SUMMARY OF THE INVENTION

The purpose of the invention is to facilitate a sizable veneering and laminating capacity of wood and other materials (one cycle 1.5 minutes, until today the known maximum speed is 5 minutes), and at the same time to reduce spending of energy and maintenance cost in comparison with the already known solutions. The aforementioned has been achieved in the manner that 4 or more working tables with membrane rotate around the central axis. The needed pressure, that is realized through the membrane made of natural rubber with 600% elasticity, helped with 900 mbar vacuum is around 0.9 kg/cm2. Such a released pressure is well enough to enable a quality adhesion of the veneer or bending of the elements when laminating 4 centimeters. Different then the flat, hydraulic and pneumatic presses, regardless of the shape, the membrane facilitates an equal pressure all over the surface of the working piece which is a guarantee for a good adhesion.

A faster adhesion process is realized by means of preheating of the working piece in the chamber with the help of infrared heaters of 1.8 kW with achieved temperature of 65° C. for 4.5 minutes. Since the elements preheating chamber can take 3 times more of the number of pieces then a working table, the total preheating time in the cycle involving 4 working tables goes down to 1.5 minutes.

The so far known models of the 70/280 cm dimension vacuum presses for the 5 minute veneering cycle use minimum 10 kW heaters. For adhesion of laminating pieces it takes several hours. using these methods and heating, the adhesion and laminating of elements process last equally long which is 5 minutes for one working table. Using such a rotational press that cycle would practically be brought to 1.5 minutes with accessorized with 1.8 KW heater.

BRIEF DESCRIPTION OF THE DRAWINGS

The invention is described in detail on the illustration shown in the draft in which>

DETAILED DESCRIPTION OF THE INVENTION

Figure 1:
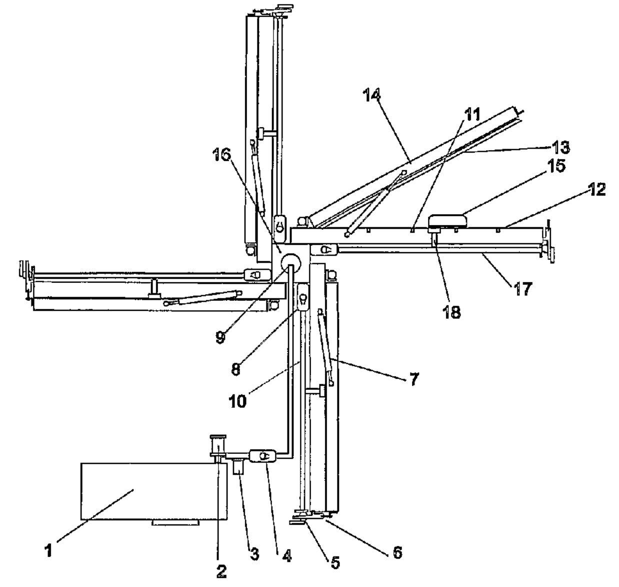
FIG. 1 represents the characteristic cross section of the press
Figure 2:
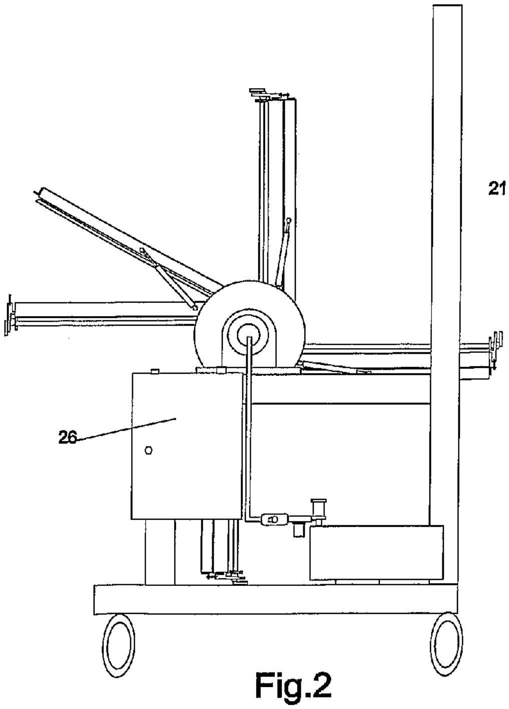
FIG. 2 represents the side view of the press from the control cabinet side
Figure 3:
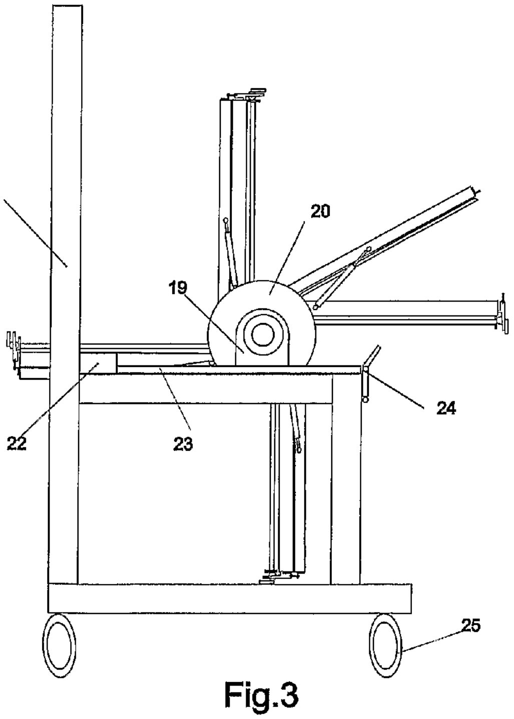
FIG. 3 represents the side view of the press from the opposite side from the control cabinet side
Figure 4:
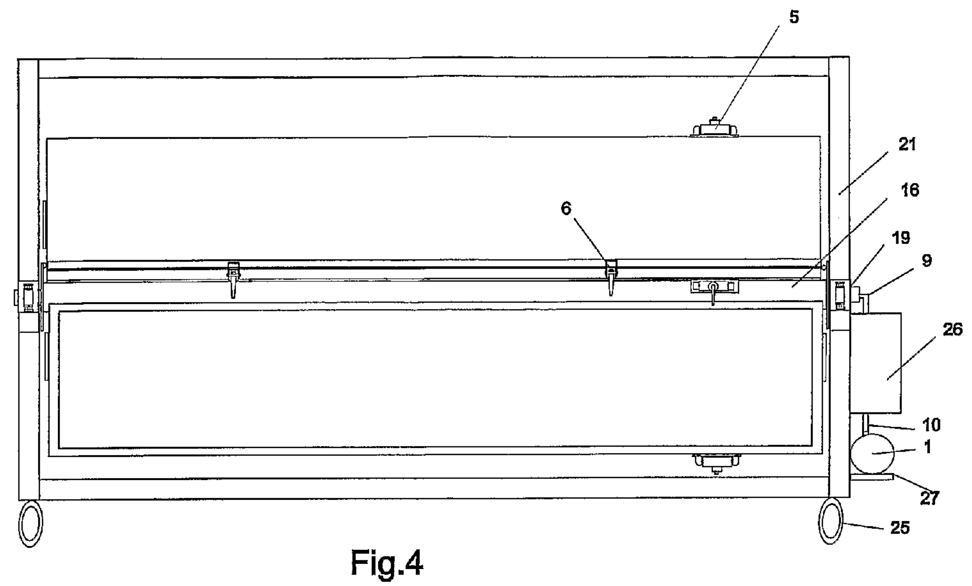
FIG. 4 represents the front appearance of the press
Figure 5:
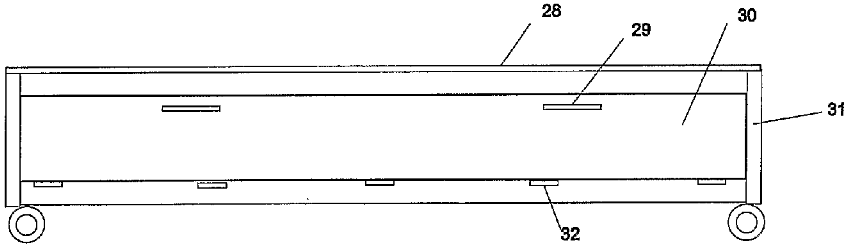
FIG. 5 represents the front part of the heating chamber
Figure 6:
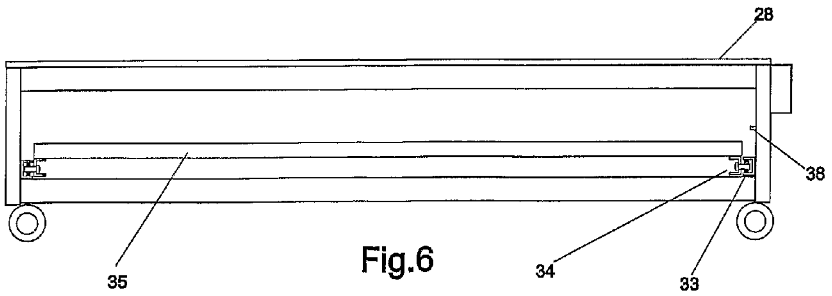
FIG. 6 represents the length along section of the heating chamber
Figure 7:
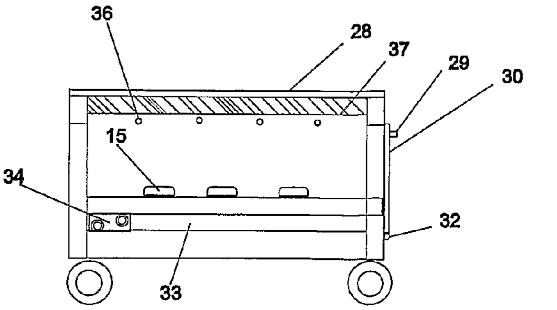
FIG. 7 represents the cross section of the heating chamber
Figure 8:
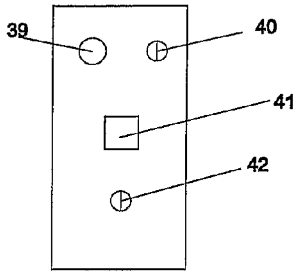
FIG. 8 represents the appearance of the control board of the control cabinet of the press
Figure 9:
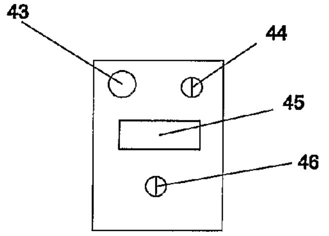
FIG. 9 represents the appearance of the control board of the heating chamber
Figure 10:
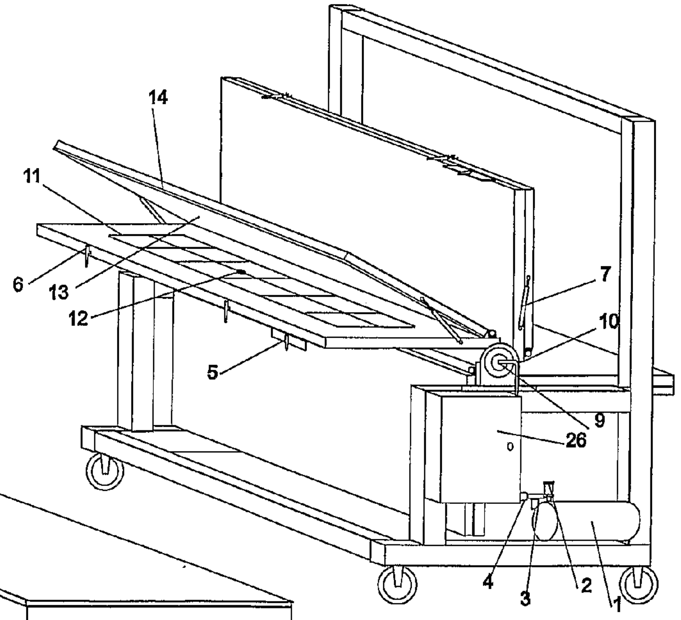
FIG. 10 represents the oblique projection of the press and heating chamber
Figure 11:
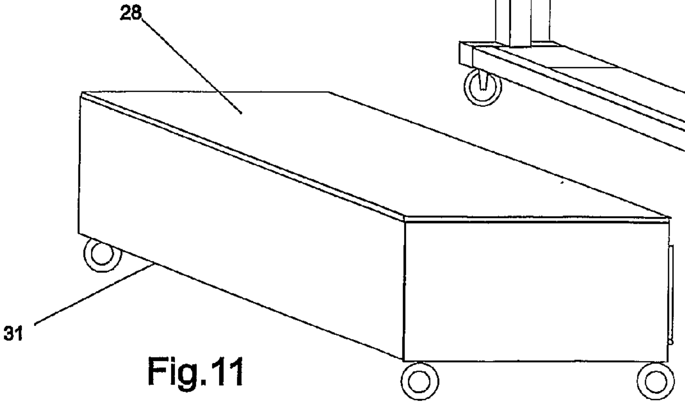
FIG. 11 represents heating chamber
Figure 12:
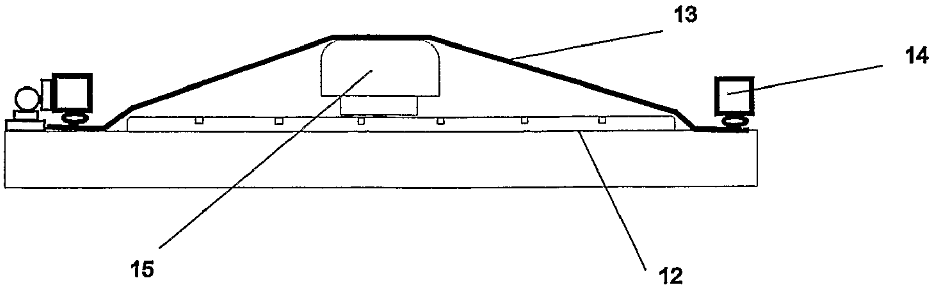
FIG. 12 represents the initial position of the working piece beneath the membrane and FIG. 13 represents the final working piece after the vacuuming.
Figure 13:
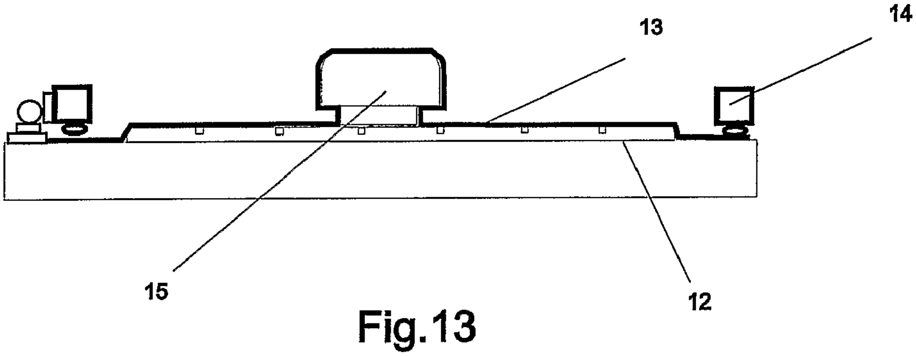

As presented in the drawing 1, 2, 3, 4 and 10 the press is consisted of:

the main construction 21, steel pipes with turning wheels 25, working tables 12 that is consisted of the frame 14 that holds the membrane 13 made of natural rubber and has appropriate elasticity and solidness, working surfaces made of impermeable material with canals 11 for vacuum that go to the connector 18 vacuum, vacuum lead 17 that links the connector with the central axis 16 through the irreversible valve 8 and further on by the rotating junction 9 towards the key vacuum lead 10, that makes a link to the vacuum pump through the irreversible vent 4 and entry filter 2 whereas the pump has the exit filter 3 and is located on the pump carrier 27, with the working table of the press. Rotating of the working tables that are installed on the central axis 16 accessorized with the rim part 20 is operating when the axis goes around in the bearing box 19 and locking of the working table is done by the auxiliary mechanism 22 for locking by pulling the handle 24 over the lever 23.

Procedure management is achieved by the control cabinet 26 which is consisted of the switch 39 in case of danger—not aus, main switch 40 turned on induced voltage into the control board. Turning on the switch 42 the vacuum pump gets started 1 its further operating is ran by the digital instrument 41 which operates in the capacity of pressure gauge and vacuum meter.

One can see from the drawings 5, 6, 7 that the heating chamber is consisted of the following:

main construction 31 which is made of steel pipes, drawer 35 chamber which is also made of steel pipes with a sliding mechanism 34 which sliding down the sliding rail 33 facilitates drawing out of ⅔ of its length. The whole chamber is on the rotating wheels 25 as well as the press is.

Handling of the operating chamber is achieved through the control cabinet drawing 9 which is consisted of the main switch 44, not aus switch 43, digital unit 45 that is in function of the thermo regulation switch and also thermometer function and switch 46 that operates switching on and switching off functions.

WAYS OF APPLICATION OF THE INVENTION

The operating modus of the heating chamber:

The element that is coated with the veneer, further in text working piece 15, is put in the heating chamber by opening the door of the chamber 30 sliding out the drawer on the sliding mechanism 34 and laying the working piece 15 onto the drawer 35. After that the drawer 35 is set back into the chamber and the door 30 is closed thus exposing the working piece 15 to direct heating by the heater 36. The procedure of heating up of the working piece is done through the control cabinet of the heating chamber, drawing 9. By turning on the main switch 40 the control board gets voltage supply, after that turning one the switch 42 the heaters are started 36. The digital instrument 45 does reading the current temperature and maintaining of the temperature within the set scale. Measuring of current temperature is done by the sound 38 placed inside the chamber. When the heating cycle on the working piece 15 is finished, the working piece is taken out from the chamber by opening the door on the chamber 30 and then sliding out the drawer 35. The heated working piece 15 is taken off from it and the next working piece is put inside. The working piece 15 is put onto surface 28 when veneer is put on it and also other coating material that is in prior pasted with adhesive glue.

Operating modus of the vacuum press with the membrane:

Such a prepared working piece with veneer is put on the working table of the press 12, and then the rim 14 is put down with the membrane 13 and gets locked by the clench 6. Turning the working valve 5 in the vacuuming position a void is formed for the air vent between the membrane 13 and the working table 12 with the working piece 15 that leads through the vacuum connector 18 through the vacuum lead 17 through the irreversible valve 5 up to the central axis 16 and from the axis through the junction 9 into the main vacuum conduit 10 towards the vacuum pump 1. In this way the membrane 13 is made contact with the working piece 15 i.e. surface of the working piece which is to be coated forming pressure of 0.9 kg/cm2. When this operation is done the working table gets unlocked by the unlocking mechanism 22 by handle 24 through the lever 23 and after that the working table gets manually rotated for 90% and gets locked again. By doing so the working table is set to its operational position, and the procedure is repeating. As one can see from drawing 1, 2, 3 and 10 the press is consisted of four working tables (6 is possible) which rotating around the central axis 16 facilitates a continuous work. When a full cycle is done 360° the working piece is taken out from the first working table by turning the valve 5 for 180° thus forming space between the membrane 13 and working table 12 through the connector and the outlet on the operating valve 5 towards the atmosphere. In this way the pressure is equalized to the atmosphere pressure and with clench 6 it makes possible unlocking the frame rim 14 with the membrane 13 and facilitated with the gas spring 7 it opens under 40° so the working piece 15 can be taken out. This enables putting the prepared working piece 15 into the press and the procedure is repeating. Operating time for such four matches the gluing and adhesion time, which enables the already mentioned: the procedure is progressing continuously. Usage of the heating chamber; drawing of 5, 6 and 7 double shortens the cycle time.

The main purpose of the press is coating—veneering of the rounded surfaces in production of the construction carpentry—door frames, batten, freeze, add-on-board and production of the furniture—kitchen fronts, cabinets, profiles laces etc.

The press has several makes that differ for their industrial dimensions, installed power and adjustments and needs of small and medium small carpentry workshops.

The invention claimed is:

1. A rotational vacuum press comprising:

a main construction defining an axis;

a plurality of movable working tables, each working table equipped with a movable frame, each working table being rotatably mounted on the axis of the main construction, each working table having a surface defining a channel;

a plurality of rubber membranes, each rubber membrane being mounted on a respective moveable working table; and a turning connector adapted to connect the channel, of each working table surface, with a vacuum conduit, wherein each working table is adapted to be locked by a mechanism with lever and handle, whereby the rotational vacuum press is configured to veneer profile surfaces and laminate wood elements and other materials according to a model, facilitated with pressure generated by vacuum and applied on the surface through the rubber membranes.

2. A rotational vacuum press with a membrane, for veneering of profile surfaces and laminating of wood elements and other materials according to a model, facilitated with pressure generated by vacuum and applied on the surface through the membrane, the rotational vacuum press comprising:

a main construction;

4 movable working tables supported by bearings, each table equipped with a movable frame, rotateably mounted on a central axis installed in the main construction, each working table having a surface with canals with vacuum;

4 fixed rubber membranes, each fixed rubber membrane being mounted on a respective moveable working table;

a connector adapted to connect each table surface canal with vacuum through a vacuum conduit that is able to link the connector with a central axis through an irreversible valve and through a turning connector; and a main vacuum conduit adapted to connect the central axis, through an irreversible valve and an entry filter, with a vacuum pump, the vacuum pump including an outlet filter connected between the vacuum pump and the main vacuum conduit and fixed on a carrier, wherein each working table is adapted to be locked by a mechanism with lever and handle, the rotational vacuum press further comprising a movable thermally insulated heating chamber placed on a lower part of the main construction, the heating chamber including heaters and drawers installed, for preheating work pieces before subjecting the work pieces to vacuum pressing, the work pieces being adapted to slide on a mechanism with rails, the vacuum press and the heating chamber being operatively connected to a control cabinet.

* * * * *